(12) United States Patent
Syrjarinne et al.

(10) Patent No.: US 9,654,992 B2
(45) Date of Patent: May 16, 2017

(54) HANDLING CALIBRATION DATA

(71) Applicant: Nokia Technologies Oy, Espoo (FI)

(72) Inventors: Jari Tapani Syrjarinne, Tampere (FI); Juha Salokannel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 156 days.

(21) Appl. No.: 14/758,559

(22) PCT Filed: Jan. 10, 2013

(86) PCT No.: PCT/IB2013/050236
§ 371 (c)(1),
(2) Date: Jun. 29, 2015

(87) PCT Pub. No.: WO2014/108753
PCT Pub. Date: Jul. 17, 2014

(65) Prior Publication Data
US 2015/0341804 A1 Nov. 26, 2015

(51) Int. Cl.
H04W 24/02 (2009.01)
H04W 72/00 (2009.01)
H04B 7/06 (2006.01)
G01S 5/02 (2010.01)
(Continued)

(52) U.S. Cl.
CPC ............. *H04W 24/02* (2013.01); *G01S 5/021* (2013.01); *H01Q 3/267* (2013.01); *H04B 7/0604* (2013.01); *H04B 7/0689* (2013.01); *H04W 72/005* (2013.01); *H04W 80/02* (2013.01)

(58) Field of Classification Search
CPC . H04W 24/04; H04W 24/02; H04W 72/0406; H04W 72/005; G01S 5/021; G01S 13/46; H04B 17/21; H04B 7/0604; H04B 7/0689; H04B 7/0617; H04B 7/0602; H04B 7/0691; H04B 17/11; H04B 17/12
See application file for complete search history.

(56) References Cited

U.S. PATENT DOCUMENTS

2009/0225697 A1* 9/2009 Solomon ............. H04W 72/046
370/328
2010/0008407 A1* 1/2010 Izumi ..................... H04B 17/21
375/219
(Continued)

OTHER PUBLICATIONS

U.S. Appl. No. 61/732,653, "Image Processing Based Array Antenna Calibration Matrix Compression", filed Dec. 3, 2012, 24 pages.
(Continued)

Primary Examiner — Hoang-Chuong Vu
(74) Attorney, Agent, or Firm — Nokia Technologies Oy

(57) ABSTRACT

Apparatus comprises: a multi-element antenna; and a transmitter configured to broadcasting multiple packets from the multi-element antenna, wherein each packet comprising: a positioning part; and a calibration data part, wherein the calibration data part of a packet comprises: a portion of calibration data; and data indicating a location of the portion of calibration data in a set of calibration data. The transmitter is configured: to switch between different elements of the multi-element antenna in a sequence when broadcasting the positioning part of the packet; and to transmit all of the calibration data part of the packet without switching between different elements of the multi-element antenna.

15 Claims, 6 Drawing Sheets

(51) Int. Cl.
*H01Q 3/26* (2006.01)
*H04W 80/02* (2009.01)

(56) References Cited

U.S. PATENT DOCUMENTS

| | | | | |
|---|---|---|---|---|
| 2010/0020857 A1* | 1/2010 | Takano | ........... | H04B 17/21 |
| | | | | 375/219 |
| 2010/0080173 A1* | 4/2010 | Takagi | ........... | H04L 27/0006 |
| | | | | 370/328 |
| 2010/0259450 A1 | 10/2010 | Kainulainen et al. | | |
| 2012/0178471 A1 | 7/2012 | Kainulainen et al. | | |
| 2012/0258669 A1 | 10/2012 | Honkanen et al. | | |
| 2012/0289241 A1 | 11/2012 | Kalliola et al. | | |
| 2014/0355503 A1* | 12/2014 | Kainulainen | ......... | H04W 64/00 |
| | | | | 370/311 |
| 2015/0304941 A1* | 10/2015 | Syrjarinne | ............. | H04W 4/02 |
| | | | | 455/41.2 |
| 2015/0350839 A1* | 12/2015 | Syrjarinne | ........... | G01C 21/206 |
| | | | | 455/404.2 |
| 2016/0088665 A1* | 3/2016 | Kim | ................... | H04W 76/021 |
| | | | | 370/329 |

OTHER PUBLICATIONS

"Bluetooth Specification Version 4.0", Specification of the Bluetooth System, Jun. 30, 2010, 2302 pages.

Extended European Search Report received for corresponding European Patent Application No. 13870996.9, dated Jul. 7, 2016, 7 pages.

International Search Report and Written Opinion received for corresponding Patent Cooperation Treaty Application No. PCT/IB2013/050236, dated Oct. 8, 2013, 13 pages.

Jara A.J. et al. "Evaluation of Bluetooth Low Energy capabilities for continuous data transmission from a wearable electrocariogram." Sixth Internaional Conference on Innovative Mobile and Internet Services in Ubiquitous Computing (IMIS), Jul. 4-6, 2012, Palermo, Italy, pp. 912-917.

* cited by examiner

| Advertising Channel Packet Header (16 bits) | BcstScannerAdd (48 bits) | AdvAdd (48 bits) | Control (8 bits) | Control data (8 bits) |

FIG. 6

| Advertising Channel Packet Header (16 bits) | AdvAdd (48 bits) | Control (8 bits) | Counter (8 bits) | BcstRspData (0-232 bits) |

FIG. 7

HANDLING CALIBRATION DATA

RELATED APPLICATION

This application was originally filed as PCT Application No. PCT/IB2013/050236 filed Jan. 10, 2013.

FIELD

The present application relates to handling calibration data.

BACKGROUND

Bluetooth Low Energy (BLE) is a new wireless communication technology published by the Bluetooth SIG as a component of Bluetooth Core Specification Version 4.0. BLE is a lower power, lower complexity, and lower cost wireless communication protocol, designed for applications requiring lower data rates and shorter duty cycles. Inheriting the protocol stack and star topology of classical Bluetooth, BLE redefines the physical layer specification, and involves many new features such as a very-low power idle mode, a simple device discovery, and short data packets, etc.

BLE technology is aimed at devices requiring a low power consumption, for example devices that may operate with one or more button cell batteries such as sensors, key fobs, and/or the like. BLE can also be incorporated into devices such as mobile phones, smart phones, tablet computers, laptop computers, desktop computers etc.

SUMMARY

Various aspects of examples of the invention are set out in the claims.

A first aspect of the invention provides a method comprising:
  broadcasting multiple packets from a multi-element antenna, each packet comprising:
  a positioning part; and
  a calibration data part, wherein the calibration data part of a packet may comprise:
    a portion of calibration data; and
    data indicating a location of the portion of calibration data in a set of calibration data,
wherein broadcasting a packet may comprise:
  switching between different elements of the multi-element antenna in a sequence when broadcasting the positioning part of the packet; and
  transmitting all of the calibration data part of the packet without switching between different elements of the multi-element antenna.

The data indicating a location of the portion of calibration data in the set of calibration data may comprise a counter value that is unique to the corresponding portion of calibration data.

The set of calibration data may be compressed calibration data. The set of calibration data may be image compressed calibration data.

The method may comprise:
  compressing a set of uncompressed calibration data to provide the set of compressed calibration data;
  dividing the set of compressed calibration data into multiple portions of partial calibration data; and
  scheduling broadcasting of the multiple portions of partial calibration data in the positioning packets.

The method may comprise receiving a request message;
  identifying from the request message that the message is a request for a portion of calibration data; and
  transmitting a response message including the requested portion of calibration data.

The response message may include data indicating a location of the portion of calibration data in the set of calibration data.

The response message may include a portion of calibration data than is larger than the portions of calibration data included in the positioning packets.

The method may comprise:
  receiving a request message;
  identifying from the request message that the message is a request for the whole set of calibration data; and
  transmitting multiple response messages each including a portion of the calibration data, wherein the multiple response messages together include the whole set of calibration data.

The method may comprise:
  identifying from the request message that the message is a request for the whole set of uncompressed calibration data; and
  transmitting multiple response messages each including a portion of the calibration data, wherein the multiple response messages together include the whole set of uncompressed calibration data.

The method may comprise:
  identifying from the request message that the message is a request for the whole set of compressed calibration data; and
  transmitting multiple response messages each including a portion of the calibration data, wherein the multiple response messages together include the whole set of compressed calibration data A second aspect of the invention provides a method comprising:
  receiving multiple positioning packets from a multi-element antenna, each positioning packet comprising:
  a positioning part; and
  a calibration data part, wherein the calibration data part of a packet may comprise:
    a portion of calibration data; and
    data indicating a location of the portion of calibration data in a set of calibration data;
  using the data indicating the locations of the portions of calibration data in the set of calibration data from the multiple packets to reconstruct the set of calibration data; and
  storing the reconstructed set of calibration data in memory.

The data indicating a location of the portion of calibration data in the set of calibration data may comprise a counter value that is unique to the corresponding portion of calibration data.

The set of calibration data may be compressed calibration data, and the method may comprise decompressing the received set of compressed calibration data and storing the resulting decompressed calibration data.

The method may comprise receiving the multiple positioning packets from a multi-element antenna of a first beacon.

The method may comprise receiving the multiple positioning packets from multi-element antennas of plural beacons.

The method may comprise:
transmitting a request message, the request message including an indication that the message is a request for a portion of calibration data; and
receiving a response message including the requested portion of calibration data.

The method may comprise transmitting the request message including data indicating a location of a missing portion of calibration data in the set of calibration data.

The response message may include data indicating a location of the portion of calibration data in the set of calibration data.

The method may comprise:
transmitting a request message, the request message indicating that the message is a request for the whole set of calibration data; and
receiving multiple response messages each including a portion of the calibration data, wherein the multiple response messages together include the whole set of calibration data.

Transmitting the request message may comprise transmitting the request message with an indication that the message is a request for the whole set of uncompressed calibration data. Transmitting the request message may comprise transmitting the request message with an indication that the message is a request for the whole set of compressed calibration data The method may comprise using the stored set of calibration data to calculate the position of apparatus.

A third aspect of the invention provides apparatus comprising:
a multi-element antenna; and
a transmitter configured to broadcasting multiple packets from the multi-element antenna, wherein each packet comprising:
a positioning part; and
a calibration data part, wherein the calibration data part of a packet may comprise:
a portion of calibration data; and
data indicating a location of the portion of calibration data in a set of calibration data,
the transmitter being configured:
to switch between different elements of the multi-element antenna in a sequence when broadcasting the positioning part of the packet; and
to transmit all of the calibration data part of the packet without switching between different elements of the multi-element antenna.

The data indicating a location of the portion of calibration data in the set of calibration data may comprise a counter value that is unique to the corresponding portion of calibration data.

The set of calibration data may be compressed calibration data.

The set of calibration data may be image compressed calibration data.

The apparatus may be configured to:
compress a set of uncompressed calibration data to provide the set of compressed calibration data;
divide the set of compressed calibration data into multiple portions of partial calibration data; and
schedule broadcasting of the multiple portions of partial calibration data in the positioning packets.

The apparatus may be configured to:
receive a request message;
identify from the request message that the message is a request for a portion of calibration data; and
transmit a response message including the requested portion of calibration data.

The response message may include data indicating a location of the portion of calibration data in the set of calibration data.

The response message may include a portion of calibration data than is larger than the portions of calibration data included in the positioning packets.

The apparatus may be configured to:
receive a request message;
identify from the request message that the message is a request for the whole set of calibration data; and
transmit multiple response messages each including a portion of the calibration data, wherein the multiple response messages together include the whole set of calibration data.

The apparatus may be configured to:
identify from the request message that the message is a request for the whole set of uncompressed calibration data; and
transmit multiple response messages each including a portion of the calibration data, wherein the multiple response messages together include the whole set of uncompressed calibration data.

The apparatus may be configured to:
identify from the request message that the message is a request for the whole set of compressed calibration data; and
transmit multiple response messages each including a portion of the calibration data, wherein the multiple response messages together include the whole set of compressed calibration data.

A fourth aspect of the invention provides apparatus comprising:
a receiver configured to receive multiple positioning packets from a multi-element antenna, each positioning packet comprising:
a positioning part; and
a calibration data part, wherein the calibration data part of a packet may comprise:
a portion of calibration data; and
data indicating a location of the portion of calibration data in a set of calibration data;
the apparatus being configured:
to use the data indicating the locations of the portions of calibration data in the set of calibration data from the multiple packets to reconstruct the set of calibration data; and
to store the reconstructed set of calibration data in memory.

The data indicating a location of the portion of calibration data in the set of calibration data may comprise a counter value that is unique to the corresponding portion of calibration data.

The set of calibration data may be compressed calibration data, the apparatus being configured to decompress the received set of compressed calibration data and store the resulting decompressed calibration data.

The apparatus may be configured to receive the multiple positioning packets from a multi-element antenna of a first beacon.

The apparatus may be configured to receive the multiple positioning packets from multi-element antennas of plural beacons.

The apparatus may be configured to:
  transmit a request message, the request message including an indication that the message is a request for a portion of calibration data; and
  receive a response message including the requested portion of calibration data.

The apparatus may be configured to transmit the request message including data indicating a location of a missing portion of calibration data in the set of calibration data.

The response message may include data indicating a location of the portion of calibration data in the set of calibration data.

The apparatus may be configured to:
  transmit a request message, the request message indicating that the message is a request for the whole set of calibration data; and
  receive multiple response messages each including a portion of the calibration data, wherein the multiple response messages together include the whole set of calibration data.

The apparatus may be configured to transmit the request message by transmitting the request message with an indication that the message is a request for the whole set of uncompressed calibration data.

The apparatus may be configured to transmit the request message by transmitting the request message with an indication that the message is a request for the whole set of compressed calibration data The apparatus may be configured to use the stored set of calibration data to calculate the position of the apparatus.

The invention also provides a computer program comprising machine readable instructions that when executed by apparatus comprising a multi-element antenna and a transmitter control it to perform the method above.

A fifth aspect of the invention non-transitory computer-readable storage medium having stored thereon computer-readable code, which, when executed by computing apparatus comprising a transmitter and a multi-element antenna, may cause the computing apparatus to perform a method comprising:
  broadcasting multiple packets from the multi-element antenna, each packet comprising:
  a positioning part; and
  a calibration data part, wherein the calibration data part of a packet may comprise:
    a portion of calibration data; and
    data indicating a location of the portion of calibration data in a set of calibration data,
  wherein broadcasting a packet may comprise:
    switching between different elements of the multi-element antenna in a sequence when broadcasting the positioning part of the packet; and
    transmitting all of the calibration data part of the packet without switching between different elements of the multi-element antenna.

The data indicating a location of the portion of calibration data in the set of calibration data may comprise a counter value that is unique to the corresponding portion of calibration data.

The set of calibration data may be compressed calibration data.

The set of calibration data may be image compressed calibration data.

The computer-readable code when executed may cause the computing apparatus to perform:
  compressing a set of uncompressed calibration data to provide the set of compressed calibration data;
  dividing the set of compressed calibration data into multiple portions of partial calibration data; and
  scheduling broadcasting of the multiple portions of partial calibration data in the positioning packets.

The computer-readable code when executed may cause the computing apparatus to perform:
  receiving a request message;
  identifying from the request message that the message is a request for a portion of calibration data; and
  transmitting a response message including the requested portion of calibration data.

The response message may include data indicating a location of the portion of calibration data in the set of calibration data.

The response message may include a portion of calibration data than is larger than the portions of calibration data included in the positioning packets.

The computer-readable code when executed may cause the computing apparatus to perform:
  receiving a request message;
  identifying from the request message that the message is a request for the whole set of calibration data; and
  transmitting multiple response messages each including a portion of the calibration data, wherein the multiple response messages together include the whole set of calibration data.

The computer-readable code when executed may cause the computing apparatus to perform:
  identifying from the request message that the message is a request for the whole set of uncompressed calibration data; and
  transmitting multiple response messages each including a portion of the calibration data, wherein the multiple response messages together include the whole set of uncompressed calibration data.

The computer-readable code when executed may cause the computing apparatus to perform:
  identifying from the request message that the message is a request for the whole set of compressed calibration data; and
  transmitting multiple response messages each including a portion of the calibration data, wherein the multiple response messages together include the whole set of compressed calibration data A sixth aspect of the invention provides a non-transitory computer-readable storage medium comprising:
  receiving multiple positioning packets from a multi-element antenna, each positioning packet comprising:
  a positioning part; and
  a calibration data part, wherein the calibration data part of a packet may comprise:
    a portion of calibration data; and
    data indicating a location of the portion of calibration data in a set of calibration data;
  using the data indicating the locations of the portions of calibration data in the set of calibration data from the multiple packets to reconstruct the set of calibration data; and
  storing the reconstructed set of calibration data in memory.

The data indicating a location of the portion of calibration data in the set of calibration data may comprise a counter value that is unique to the corresponding portion of calibration data.

The set of calibration data may be compressed calibration data, the method comprising decompressing the received set of compressed calibration data and storing the resulting decompressed calibration data.

The computer-readable code when executed may cause the computing apparatus to perform receiving the multiple positioning packets from a multi-element antenna of a first beacon.

The computer-readable code when executed may cause the computing apparatus to perform receiving the multiple positioning packets from multi-element antennas of plural beacons.

The computer-readable code when executed may cause the computing apparatus to perform:
  transmitting a request message, the request message including an indication that the message is a request for a portion of calibration data; and
  receiving a response message including the requested portion of calibration data.

The computer-readable code when executed may cause the computing apparatus to perform transmitting the request message including data indicating a location of a missing portion of calibration data in the set of calibration data.

The response message may include data indicating a location of the portion of calibration data in the set of calibration data.

The computer-readable code when executed may cause the computing apparatus to perform:
  transmitting a request message, the request message indicating that the message is a request for the whole set of calibration data; and
  receiving multiple response messages each including a portion of the calibration data, wherein the multiple response messages together include the whole set of calibration data.

The computer-readable code when executed may cause the computing apparatus to perform transmitting the request message by transmitting the request message with an indication that the message is a request for the whole set of uncompressed calibration data.

The computer-readable code when executed may cause the computing apparatus to perform transmitting the request message by transmitting the request message with an indication that the message is a request for the whole set of compressed calibration data The computer-readable code when executed may cause the computing apparatus to perform using the stored set of calibration data to calculate the position of apparatus.

A seventh aspect of the invention provides apparatus, comprising:
  a transmitter;
  a multi-element antenna;
  at least one processor; and
  at least one memory having computer-readable code stored thereon,
wherein the computer-readable code when executed controls the at least one processor to perform a method comprising:
  broadcasting multiple packets from the multi-element antenna, each packet comprising:
  a positioning part; and
  a calibration data part, wherein the calibration data part of a packet may comprise:
    a portion of calibration data; and
    data indicating a location of the portion of calibration data in a set of calibration data,
  wherein broadcasting a packet may comprise:
    switching between different elements of the multi-element antenna in a sequence when broadcasting the positioning part of the packet; and
    transmitting all of the calibration data part of the packet without switching between different elements of the multi-element antenna.

The data indicating a location of the portion of calibration data in the set of calibration data may comprise a counter value that is unique to the corresponding portion of calibration data.

The set of calibration data may be compressed calibration data.

The set of calibration data may be image compressed calibration data.

The computer-readable code when executed may cause the computing apparatus to perform:
  compressing a set of uncompressed calibration data to provide the set of compressed calibration data;
  dividing the set of compressed calibration data into multiple portions of partial calibration data; and
  scheduling broadcasting of the multiple portions of partial calibration data in the positioning packets.

The computer-readable code when executed may cause the computing apparatus to perform:
  receiving a request message;
  identifying from the request message that the message is a request for a portion of calibration data; and
  transmitting a response message including the requested portion of calibration data.

The response message may include data indicating a location of the portion of calibration data in the set of calibration data.

The response message may include a portion of calibration data than is larger than the portions of calibration data included in the positioning packets.

The computer-readable code when executed may cause the computing apparatus to perform:
  receiving a request message;
  identifying from the request message that the message is a request for the whole set of calibration data; and
  transmitting multiple response messages each including a portion of the calibration data, wherein the multiple response messages together include the whole set of calibration data.

The computer-readable code when executed may cause the computing apparatus to perform:
  identifying from the request message that the message is a request for the whole set of uncompressed calibration data; and
  transmitting multiple response messages each including a portion of the calibration data, wherein the multiple response messages together include the whole set of uncompressed calibration data.

The computer-readable code when executed may cause the computing apparatus to perform:
  identifying from the request message that the message is a request for the whole set of compressed calibration data; and
  transmitting multiple response messages each including a portion of the calibration data, wherein the multiple response messages together include the whole set of compressed calibration data An eighth aspect of the invention provides apparatus, comprising:
  a receiver;
  at least one processor; and
  at least one memory having computer-readable code stored thereon,
wherein the computer-readable code when executed controls the at least one processor to perform a method comprising:

receiving multiple positioning packets from a multi-element antenna, each positioning packet comprising:
a positioning part; and
a calibration data part, wherein the calibration data part of a packet may comprise:
a portion of calibration data; and
data indicating a location of the portion of calibration data in a set of calibration data;
using the data indicating the locations of the portions of calibration data in the set of calibration data from the multiple packets to reconstruct the set of calibration data; and
storing the reconstructed set of calibration data in memory.

The data indicating a location of the portion of calibration data in the set of calibration data may comprise a counter value that is unique to the corresponding portion of calibration data.

The set of calibration data may be compressed calibration data, the method comprising decompressing the received set of compressed calibration data and storing the resulting decompressed calibration data.

The computer-readable code when executed may cause the computing apparatus to perform receiving the multiple positioning packets from a multi-element antenna of a first beacon.

The computer-readable code when executed may cause the computing apparatus to perform receiving the multiple positioning packets from multi-element antennas of plural beacons.

The computer-readable code when executed may cause the computing apparatus to perform:
transmitting a request message, the request message including an indication that the message is a request for a portion of calibration data; and
receiving a response message including the requested portion of calibration data.

The computer-readable code when executed may cause the computing apparatus to perform transmitting the request message including data indicating a location of a missing portion of calibration data in the set of calibration data.

The response message may include data indicating a location of the portion of calibration data in the set of calibration data.

The computer-readable code when executed may cause the computing apparatus to perform:
transmitting a request message, the request message indicating that the message is a request for the whole set of calibration data; and
receiving multiple response messages each including a portion of the calibration data, wherein the multiple response messages together include the whole set of calibration data.

The computer-readable code when executed may cause the computing apparatus to perform transmitting the request message by transmitting the request message with an indication that the message is a request for the whole set of uncompressed calibration data.

The computer-readable code when executed may cause the computing apparatus to perform transmitting the request message by transmitting the request message with an indication that the message is a request for the whole set of compressed calibration data The computer-readable code when executed may cause the computing apparatus to perform using the stored set of calibration data to calculate the position of computing apparatus.

Bluetooth Low Energy or BLE as used herein denotes Bluetooth Core Specification Version 4.0 or later versions that are backwards-compatible with Version 4.0. A BLE device or component is a device or component that is compatible with Bluetooth Core Specification Version 4.0.

BRIEF DESCRIPTION OF THE DRAWINGS

For a more complete understanding of example embodiments of the present invention, reference is now made to the following descriptions taken in connection with the accompanying drawings in which:

FIG. 6 is a diagram showing a request message transmitted by the mobile device and received by the beacon of FIG. 1; and FIG. 7 is a diagram showing components of a response message as broadcast by the beacon and received by the mobile device of FIG. 1.

DETAILED DESCRIPTION OF VARIOUS EMBODIMENTS

BLE technology has been proposed to be used in high accuracy indoor positioning (HAIP) systems. HAIP with BLE uses an array of phased antennas to calculate angle-of-departure or angle-of-arrival of a signal. The principles behind calculating the angle-of-departure or angle-of-arrival are described in the prior art.

There are two main options for positioning a mobile device or beacon in a BLE HAIP system. The same applies to other MIMO antenna systems, and to other beamforming systems.

In a first option, the mobiles/tags transmit a BLE positioning packet, which is received at a base station (which can be called a locator) including an antenna array. The base station (or some other device) measures the angle-of-arrival (both azimuth and elevation angles) of the signal using samples of the positioning packet received at different elements of the antenna array, and consequently calculates the position of the mobile/tag. This can be called network-centric positioning. The network-centric approach is limited by capacity.

In a second option, a base station includes an antenna array and transmits a BLE positioning packet from different elements of the antenna array in a way that allows the mobile/tag to calculate the angle-of-departure (both azimuth and elevation angles) of the signal from the base station. The base station here can be termed a beacon. This can be termed mobile-centric positioning. The mobile-centric case is advantageous from the capacity point of view as any number of devices can measure and use broadcast signals for positioning purposes.

A base station or beacon may be able to operate according to both options.

It is the mobile-centric option that is of primary interest in the following, although of course a beacon may operate in the mobile-centric mode as well as the network-centric mode.

Figure 1:
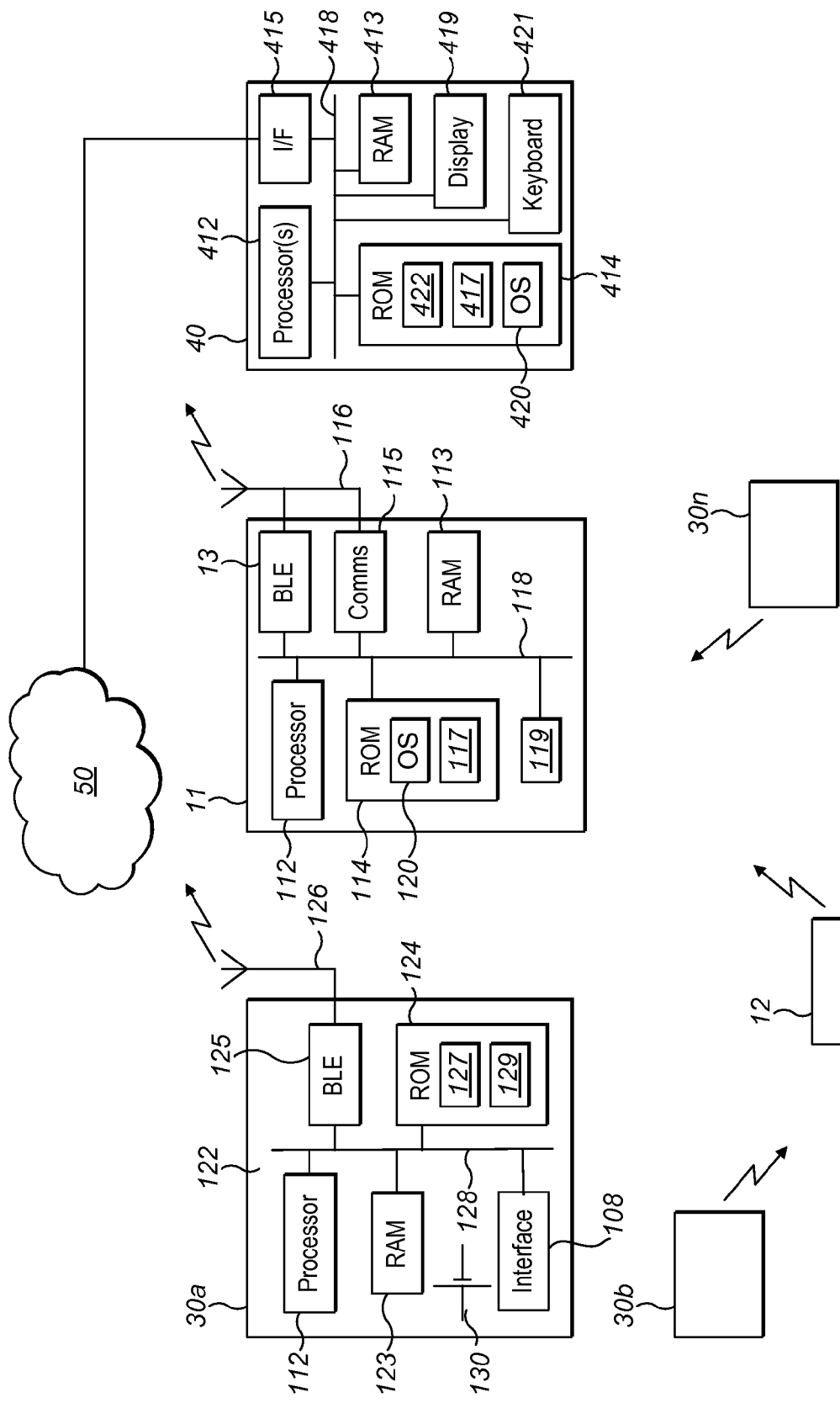
FIG. 1 is a schematic diagram of a system according to aspects of the invention including components according to aspects of the invention and operating according to aspects of the invention.

FIG. 1 shows a system according to embodiments of the invention. The system 10 includes a first device 11 and a second device 12. It also includes first to nth BLE beacons 30a, 30b to 30n, each of which may be referred to as a beacon 30. The system also includes a server 40. The first and second devices 11, 12 are mobile or portable and their locations can be tracked.

Briefly, the BLE beacons 30 are based at different locations within a building or complex of buildings and periodically transmit two different messages. These messages are, firstly, AoD positioning packets and, secondly, positioning advertisement messages. Both the AoD positioning messages and the positioning advertisement messages transmitted by a given beacon 30 include an identifier that is unique to that beacon 30 within the building.

Each of the BLE beacons 30 includes multiple antenna elements and transmits the AoD positioning packets including a certain packet tail called AoD extension. The beacon has multiple antenna elements which are used sequentially during the transmission of the AoD extension. The sequence of antenna elements involves switching between them in a pre-defined order. Each of the first and second devices 11, 12 is able to receive an AoD positioning packet from the BLE beacons 30 and calculate, from parameters of the received signal at the part corresponding to the AoD extension, a bearing from the beacon 30 at which the AoD positioning packet was received at the device 11, 12. The bearing is able to be calculated because of the form given to the signal transmitted along the bearing by the multiple antenna elements.

The positioning advertisement messages include information designating the location and orientation of the beacon 30. The location of the beacon can be given e.g. in Cartesian coordinates, Polar coordinates, Spherical coordinates or without coordinates (enabling positioning just relative to the beacon). The positioning advertisement messages may be sent from only a single element of the antenna 116. The positioning advertisement messages are received at the devices 11, 12.

Both AoD positioning packets and positioning advertisement messages are transmitted periodically, although the AoD positioning packets are transmitted more frequently.

The devices 11, 12 then can calculate their position using information designating the location and orientation of the beacon and the calculated bearing. Devices 11, 12 can calculate their locations having received an AoD positioning packet from one beacon with a reasonable degree of accuracy. Devices 11, 12 can calculate their locations with greater accuracy by triangulating information relating to AoD positioning packets received from two or more beacons, although the accuracy achieved using only one beacon typically is sufficient. Devices 11, 12 are able to calculate their location without network assistance.

The first device 11 includes a BLE module 13, which operates according to the BLE standard. Each of the BLE beacons 30 also includes a BLE module that operates according to the BLE standard.

The first device 11 includes a processor 112. The processor 112 is connected to volatile memory such as RAM 113 by a bus 118. The bus 118 also connects the processor 112 and the RAM 113 to non-volatile memory, such as ROM 114. A communications interface or module 115 is coupled to the bus 118, and thus also to the processor 112 and the memories 113, 114. A BLE module 13 is coupled to the bus 118, and thus also to the processor 112 and the memories 113, 114. An antenna 116 is coupled to the communications module 115 and the BLE module 13, although each may instead have its own antenna. Within the ROM 114 is stored a software application 117. The software application 117 in these embodiments is a navigation application, although it may take some other form. An operating system (OS) 120 also is stored in the ROM 114.

The first device 11 may take any suitable form. Generally speaking, the first device 11 may comprise processing circuitry 112, including one or more processors, and a storage device 114, 113, comprising a single memory unit or a plurality of memory units. The storage device 114, 113 may store computer program instructions that, when loaded into the processing circuitry 112, control the operation of the first device 11.

The BLE module 13 may take any suitable form. Generally speaking, the BLE module 13 of the first device 11 may comprise processing circuitry, including one or more processors, and a storage device comprising a single memory unit or a plurality of memory units. The storage device may store computer program instructions that, when loaded into the processing circuitry, control the operation of the BLE module 13.

The first device 11 also comprises a number of components which are indicated together at 119. These components 119 may include any suitable combination of a display, a user input interface, other communication interfaces (e.g. WiFi, etc.), a speaker, a microphone, and a camera. The components 119 may be arranged in any suitable way.

The BLE module 13 includes a communication stack that is implemented at least partly in software using processor and memory resources (not shown), all of which are included within the BLE module 13. The BLE module 13 is configured, when enabled by the navigation application 117, to calculate the location of the host device 11 as described above, and to report the location to the navigation application 117.

The navigation application 117 is configured to control the BLE module 13 to switch between a positioning mode in which it calculates the position of the host device 11, 12 and a non-positioning mode in which it does not calculate the position of the host device 11, 12, as required by the navigation application 117.

The navigation application 117 may for instance control the BLE module to reside in the positioning mode when positioning has been enabled by the user or by the operating system 120 and when outdoor positioning (e.g. GPS) is unavailable, and to reside in the non-positioning mode otherwise. Alternatively, the navigation application 117 may for instance control the BLE module to reside in the positioning mode when positioning has been enabled by the user or by the operating system 120 and when BLE positioning advertisement messages have been received within a certain time period (e.g. 10 minutes before the current time), and to reside in the non-positioning mode otherwise.

The second device 12 may be configured and operate in the same way as the first device 11.

The devices 11, 12 may be mobile phones, smart phones, tablet computers, laptop computers, cameras, mp3-players, equipment integrated within vehicles, etc. The devices 11, 12 may be based around any suitable operating system, for instance the Symbian operating system or Microsoft Windows operating system, although any other operating system may instead be used. The devices 11, 12 may run different operating systems.

The beacon 30, for instance the first beacon 31a, includes a BLE module 125, an antenna 126, a source of power 130, a processor 112, RAM 123, ROM 124, software 127 and a bus 128 are constituted and connected in any suitable way. The antenna 126 is a multi-element antenna, as described below.

The ROM 124 of the beacon 30 also stores information 129. The information 129 includes an identifier that identifies the beacon, the location of the beacon, and the orientation of the beacon.

The beacon 30 includes a communication interface 108, using which communications can be received from the server 40. The server 40 may be connected either directly or indirectly with the beacon 30. The server 40 may be connected with the beacon 30 by Ethernet.

The source of power 130 may be for instance a power-over-Ethernet source, a battery, or mains power. The source of power 130 powers the BLE module 121 and any other components of the beacon 30.

The BLE module 121 of the beacon 30 is both a transmitter and a receiver.

Each of the BLE beacons 30 includes multiple antenna elements (indicated together at 126 in the Figure) and transmits AoD positioning messages using these multiple antenna elements simultaneously. By transmitting the AoD positioning messages in this way, a device 11, 12 can calculate from parameters of the received signal that included the AoD positioning message an angle (actually, both azimuth and elevation angles) from the beacon 30 at which the device 11, 12 is located.

Each of the BLE beacons 30 also is configured to transmit information designating the location and orientation of the beacon 30. This information forms part of the positioning advertisement messages.

Using calibration data describing calibration of the multi-element antenna 126, devices 11, 12 can calculate their locations having received an AoD positioning packet from one beacon 30 with a reasonable degree of accuracy. Devices 11, 12 can calculate their locations with greater accuracy by triangulating or by combining location information relating to AoD positioning message received from two or more beacons, although the accuracy achieved using only one beacon typically is sufficient. As described below, devices 11, 12 may be able to calculate their location without network assistance.

Positioning advertisement messages may be transmitted by each beacon 30 periodically, for instance at 1 Hz (1 second intervals) or 2 Hz (0.5 second intervals) or at intervals defined by some component within the system. They may alternatively be transmitted on request of some component within the system. In BLE, advertisement messages are called ADV_IND. Each includes a packet data unit (PDU), called an ADV_IND PDU. Response messages are called BCST_REQ. Each includes a packet data unit (PDU), called a BCST_REQ PDU. A device may respond to receiving an ADV_IND PDU by transmitting a response message BCST_REQ PDU, following which the beacon will transmit a response message BCST_RSP PDU.

In this specification, the terms 'message' and 'packet' are used interchangeably since they are intrinsically linked.

AoD positioning messages may be transmitted by each beacon 30 periodically, for instance at 20 Hz (so millisecond intervals). Clearly, devices 11, 12 can calculate their positions at the same periodicity, or the devices 11, 12 can filter multiple measurements for better accuracy. Such a frequency of transmission of AoD positioning messages allows rapid and reliable positioning updates for the devices 11, 12. In BLE, AoD positioning advertisement messages are called AoD_BCST_IND packets.

The beacon 30 may take any suitable form. Generally speaking, the beacon 30 may comprise processing circuitry, including one or more processors, and a storage device, comprising a single memory unit or a plurality of memory units. The storage device may store computer program instructions that, when loaded into the processing circuitry, control the operation of the beacon 30.

The other beacons 30b . . . 30n may be configured and operate in the same way as the first beacon 30a. The other beacons are different to the first beacon 30a at least in that the information 129 stored in the ROM 124 includes a different identifier and a different location, and may also include a different orientation of the beacon.

The server 40 includes a processor 412. The processor 412 is connected to volatile memory such as RAM 413 by a bus 418. The bus 418 also connects the processor 112 and the RAM 413 to non-volatile memory, such as ROM 414. A communications interface 415 is coupled to the bus 418, and thus also to the processor 412 and the memories 413, 414. The interface 415 is connected to the radio network 50 in any suitable way, for instance via the Internet or a local network. Within the ROM 414 is stored a software application 417. An operating system (OS) 420 also is stored in the ROM 414. Within the ROM 414 is also stored a location database 422.

An output device such as a display 419 may be provided with the server 40. An input device such as a keyboard 421 may be provided with the server 40.

The server 40 may take any suitable form. Generally speaking, the server 40 may comprise processing circuitry 412, including one or more processors, and a storage device 414, 413, comprising a single memory unit or a plurality of memory units. The storage device 414, 413 may store computer program instructions that, when loaded into the processing circuitry 412, control the operation of the server 40.

Some further details of components and features and alternatives for them will now be described.

The computer program instructions 117 may provide the logic and routines that enables the first device 11 to perform the functionality described below. The computer program instructions 117 may be pre-programmed into the first device 11. Alternatively, they may arrive at the first device 11 via an electromagnetic carrier signal or be copied from a physical entity such as a computer program product, a non-volatile electronic memory device (e.g. flash memory) or a record medium such as a CD-ROM or DVD. They may for instance be downloaded to the first device 11 from a server, for instance the server 40 but possibly another server such as a server of an application marketplace or store.

The processing circuitry 112, 122, 412 may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry or processor 112, 122, 412 may be termed processing means.

Typically, the BLE modules 13, 121 each comprise a processor coupled connected to both volatile memory and non-volatile memory. The computer program is stored in the non-volatile memory and is executed by the processor using the volatile memory for temporary storage of data or data and instructions.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Each BLE module 13, 121 may be a single integrated circuits. Each may alternatively be provided as a set of integrated circuits (i.e. a chipset). The BLE modules 13, 121 may alternatively be hardwired, application-specific integrated circuits (ASIC).

The communication interface 115 may be configured to allow two-way communication with external devices and/or networks. The communication interface may be configured to communicate wirelessly via one or more of several protocols such as Global System for Mobile Communications (GSM), Code Division Multiple Access (CDMA), Universal Mobile Telecommunications System (UMTS) and IEEE 712.11 (Wi-Fi). Alternatively or additionally, the communication interface 115 may be configured for wired communication with a device or network.

The apparatus 11, 12, 40, 30 may comprise further optional software components which are not described in this specification since they may not have direct interaction with the features described.

The BLE beacons 30 are distributed around a building or premises. For instance a first beacon 30a may be located in a canteen, a second beacon 30b may be located in a reception area, and so on. The first and second beacons 30a and 30b can be referred to as beacons 30. Beacons 30 do not need to provide complete coverage of a building, but advantageously are provided to provide good coverage of all key locations within the building.

It is possible in a HAIP system to have a flat array antenna 126 with P elements, with each element having two separate feeds for orthogonal polarisations. K channels are constructed to transmit or receive signal through the array antenna, where K=2*P+1. The factor of 2 is derived from there being two feeds with orthogonal polarisations per antenna element. The addition of 1 is included because one extra channel is constructed by combining the two different polarisations of a central element.

To perform positioning function, a calibration matrix of the array antenna is firstly obtained by measurement in a test chamber.

By dividing the azimuth angle range 0~360 degree into M grids and the elevation angle range 0~90 degree into N grids, cross polarisation calibration source (vertical polarisation and horizontal polarisation) signals are recorded in every channel and at every azimuth and elevation angle grid. Each recorded signal is represented by I and Q values. Here, the calibration matrix is a four dimensional (4-D) matrix C[4][N][M][K], where the first two elements in the first dimension represent I and Q values from the vertical polarised source and the following two elements in the first dimension represent I and Q values from the horizontal polarised source. In summary, the calibration matrix measurement is performed by recording array responses of all channels when signal are incident from all possible azimuth and elevation angles.

When performing positioning in mobile-centric mode, the signal is transmitted from the beacon 30 to the mobile devices 11, 12. A positioning algorithm running in the mobile device 11, 12 receives K channel signals and searches for the most likely K-dimension data in the calibration matrix. From this, the mobile device 11, 12 makes a decision as to which position in the azimuth and elevation grid the signal originates.

In mobile-centric positioning mode, the system works as an inverse like form of calibration matrix measurement. The array-antenna 126 broadcasts a continuous wave, which can be viewed as '1' in the baseband complex model before modulation, from each channel sequentially, in a particular switching pattern. The mobile device 11, 12 receives the signals emitted from all channels within a period of time. According to the reciprocal theory of radio wave propagation, the mobile device 11, 12 actually receives the response of all channels just like the recorded response in the chamber measurement. The positioning algorithm running within the mobile device 11, 12 performs correlation between the received signal vector and the calibration matrix.

It will be appreciated here that the calibration matrix has N*M signal vectors, which represent the array response from N*M azimuth-elevation angle pairs. Thus, N*M correlations are performed and from the most similar vector the corresponding azimuth-elevation angles pair can be found.

The calibration data can be substantial, typically of the order of a few Megabytes. A mobile device needs to obtain the calibration data for a multi-element antenna 126 only once, and this calibration data can then be used when positioning using signals received from beacons having the same multi-element antenna configuration.

There are a number of options for provisioning mobile devices with the calibration data. For some mobile devices, such as simple tags, configuring the tag with the calibration data during manufacture may be the best option. For more sophisticated devices, providing the calibration data on a server (e.g. the server 40) that the mobile device can access through cellular radio, Wi-Fi etc. may be the best option. BLE has very limited bandwidth, and it has not been proposed to communicate the calibration data using BLE.

Embodiments of this invention provide a scheme whereby the calibration data can be provisioned to mobile devices using a low bandwidth resource, such as BLE, in a mobile-centric positioning system.

In brief, the embodiments involve dividing the calibration data into many small parts or portions, and a beacon broadcasting the parts as part of AoD positioning packets, in particular in a non-switching period of the AoD positioning packets. This results in the calibration data being broadcast potentially to many mobile devices simultaneously, without requiring two-way communication between the beacon and any of the devices, although a relatively long period of time is required for all of the calibration data to be broadcast. This is considered to provide a particularly efficient bandwidth utilisation because it does not involve transmitting any additional packets; instead, it merely involves including more data in the AoD positioning packets. Moreover, the bandwidth utilisation is not dependent on the number of mobile devices that require the calibration data, and a very large (unlimited) number of mobile devices could receive the calibration data simultaneously if needed without any additional burden on the beacon.

The embodiments also involve providing mobile devices with missing parts of the calibration data on request. This allows parts of the calibration data that could not be received by the mobile device when broadcast with the AoD positioning packets, for instance because of temporary interference or scheduling issues in the mobile device, to be provisioned to the mobile device without requiring the mobile device to receive the missing parts from another broadcast of the calibration data over another cycle of AoD positioning packets, or from another beacon.

The combination of broadcast as part of the AoD positioning packets and providing missing parts on request is considered to be a particularly efficient use of the bandwidth provided by BLE, in particular since the mobile devices request missing parts of the calibration data only if they are not received when broadcast with AoD packets.

Additionally, the embodiments provide that the beacon broadcasts as much calibration data as can be fitted into a response message. This decreases the probability that a mobile device will be missing a part of the calibration data, and thereby overall reduces the number of response messages transmitted by the beacon, thus minimising bandwidth utilisation.

Furthermore, the embodiments provide that calibration data can additionally be provided in whole, in compressed or uncompressed form, on request. Delivery of the whole calibration data is provided over a data channel. This is inefficient use of bandwidth and beacon resources, however it allows mobile devices to obtain calibration data quickly when needed.

Operation of the beacon 30 in broadcasting calibration data as part of AoD Positioning messages will now be described with reference to FIG. 2.

Here, the operation starts at step S1. At step S2, the beacon compresses the calibration data. This may be performed in any suitable way. For instance, the calibration data may be compressed as an image, resulting in compressed calibration image data. This may be performed in any suitable way, for instance as described in co-pending US provisional patent application No. 61/732,653.

Compression of the calibration data may instead be performed externally to the beacon 30, for instance by the server 40. Compression of the calibration data need only be performed once.

At step S3, the beacon 30 divides the compressed data. This involves division of the data into parts that are sufficiently small to be included in the AoD positioning messages. The amount of data in each part depends on the particular implementation. In the case of a BLE AoD_BCST_IND packet, 71 bits (10 bytes or octets) of data can be accommodated. Reserving one byte/octet for a counter, 9 bytes/octets are available per AoD positioning message. The number of AoD positioning messages that are needed to accommodate the whole of the compressed calibration data depends on the size of the data and the space available per message. For compressed calibration data of 600 bytes/octets, which might be considered to be typical, and an allocation of 9 bytes/octets per AoD positioning message, 67 AoD positioning messages are needed. It will be appreciated that this equates to 3.3 seconds for a packet transmission rate of 20 per second.

At step S4, the portions of the calibration data are provided with counter values. Each portion is provided with a counter value that allows the compressed calibration data to be reconstructed at the mobile device 11, 12. For instance, the portions of the divided calibration data may be numbered from 0 to 66 (for 67 AoD positioning messages). Any other suitable scheme may be used instead. The counter value for each portion is unique, allowing the portion to be uniquely identified.

At step S5, the transmission of the portions, of calibration data, with their respective counters, is scheduled. They may be scheduled to be broadcast in sequence starting with the first portion and ending with the last, for instance.

Figure 5:
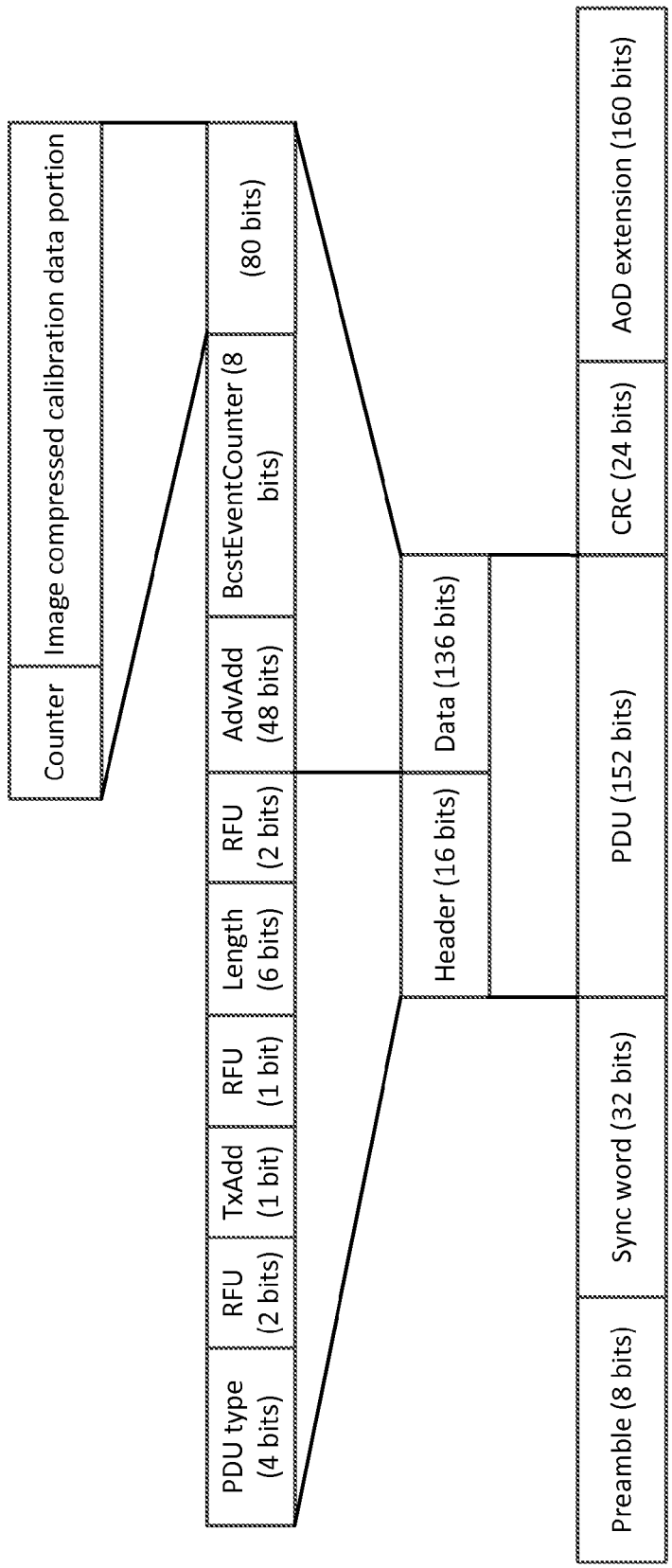
FIG. 5 is a diagram showing components of an AoD positioning message as broadcast by the beacon and received by the mobile device of FIG. 1.

In BLE, the AoD positioning messages are broadcast as AoD_BCST_IND packets, an example of which is shown in FIG. 5. The counter and the portion of the calibration data are included in the Profile Data section of the AoD_BCST_IND PDU.

As shown in FIG. 5, there are five main components to the message. The first part is a preamble. The second part is a sync word. The third part is a packet data unit (PDU). The fourth part is a cyclic redundancy check (CRC). The fifth part is an AoD extension or tail.

Here, the preamble is one octet (eight data bits, also known as one byte). The sync word is four octets. The PDU is between two and 39 octets. The CRC is three octets. The AoD extension is 160 bits (20 octets).

As shown in FIG. 5, the PDU includes two main sections. The first is the header, and the second is the payload. The header here has 64 bits (six octets). The payload has a length that is between zero and 31 octets, as per the length field in the header part of the PDU.

The header is shown in FIG. 5 as being divided into six fields. The PDU type field comprises four bits, and identifies the type of the PDU. The second field is reserved for future use (RFU) and includes two bits. A TxAdd field is one bit. The fourth field is reserved for future use (RFU) and includes one bit. The Length field includes six bits. The sixth field is reserved for future use (RFU) and includes two bits.

The payload includes three fields. An AdvA field (or AdvAdd field) is 6 octets (48 bits). A BcstEventCounter field is 8 bits. The remaining 71 bits form the Profile Data, and 8 bits (1 octet) are allocated to the Counter Value and 72 bits (9 octets) are allocated to the calibration data portion.

The TxAdd field indicates whether the address of the beacon 30 in the AdvA field is public or random. The AdvA field includes the public or random address of the beacon 30.

At step S6, the AoD positioning messages are transmitted. They are broadcast at any suitable interval, for instance 50 ms intervals. They are broadcast on a BLE data channel.

The AoD positioning tail part of the messages are transmitted during a switching interval and the calibration data portion (and the preamble, sync word, CRC etc.) are transmitted during a non-switching interval. In the switching interval, the beacon 30 causes the different ones of the antenna elements 126 to be switched between in a predetermined sequence. Each antenna element 126 is transmitted from twice, each time at a different polarisation. In the non-switching interval, there is no switching between different antenna elements 126. Instead, just one antenna element, for instance a central antenna element, is used for transmission during the non-switching interval. The switching between antenna elements during the transmission of the AoD tail allows a mobile device 11, 12 to determine a bearing from itself to the beacon 30. The non-switching between antenna elements during the transmission of the rest of the AoD positioning message allows the mobile device 11, 12 to demodulate the data from the signal. Bearing determination from this section of the AoD positioning message is not needed.

Step S6 is repeated continually. Once the last portion of calibration data in a cycle has been transmitted, the next cycle starts with the transmission of the first portion of calibration data, and so on.

The operation of the beacon 30 as described above with reference to FIG. 2 is pure broadcast, and there is no feedback or other active involvement from mobile devices 11, 12. This operation can be called autonomous calibration data delivery.

Figure 3:
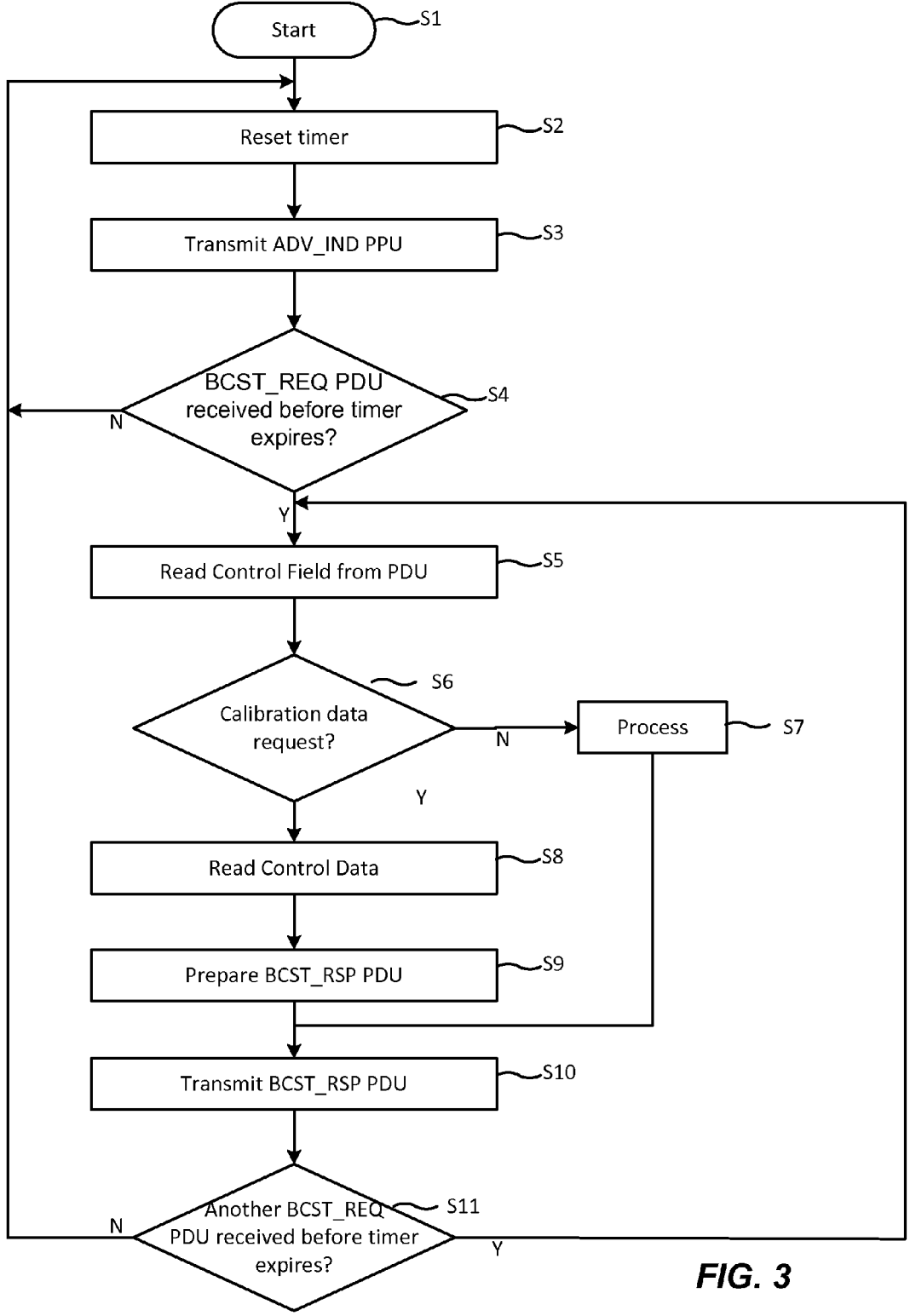
FIG. 3 is a flow chart illustrating another operation of the beacon of FIG. 1 according to embodiments of the invention.

Operation of the beacon in providing missing portions of calibration data on request will now be described with reference to FIG. 3.

Operation starts at step S1. At step S2, a time is reset. This timer determines the interval between successive advertising message transmissions, and may take any suitable value. For instance, it may be 0.5 second or 1 second. At step S3, an advertisement message is transmitted. The advertisement message is an invitation to mobile devices 11, 12 to request data. In this BLE embodiment, the advertisement message is an ADV_IND PDU.

At step S4, it is determined whether a request is received from a mobile device before the timer expires. A request takes the form in this embodiment of a BLE BCST_REQ PDU, such as that shown in FIG. 6. If no request is received, the operation returns to step S2, where the counter is reset before another advertisement message is transmitted at step S3. This provides transmission of the advertisement messages at intervals set by the timer. If a request is received, the operation proceeds to step S5.

At step S5, the beacon 30 reads a value from the Control field of the received request. This value indicates whether the request is a request for missing calibration data.

At step S6, the beacon determines whether the request is a request for missing calibration data. This involves comparing the value in the Control field of the request with stored data that relates values to their meanings. The mobile device 11, 12 is configured to include a value in the Control field that indicates that the request is a request for missing calibration data. The beacon 30 is configured to recognise the value in the Control field indicating that the request is a request for missing calibration data. For instance, both the mobile device 11, 12 and the beacon 30 may be configured to know that a predetermined bit, for instance bit 8, of the Control field, indicates whether the request is a request for missing calibration data. Both the mobile device 11, 12 and the beacon 30 may be configured to know that a predetermined value, for instance 1, indicates that the request is a request for missing calibration data, and that the opposite value, for instance 0, indicates that the request is not a request for missing calibration data.

The mobile device 11, 12 is configured, when including a value in the Control Data field that indicates that the request is a request for missing calibration data, to include a value in a Control Data field indicating a counter value relating to missing calibration data. The beacon 30 is configured to read the value in the Control Data field indicating the counter value relating to missing calibration data at step S8. This allows the beacon 30 to determine which portion of the calibration data is being requested by the mobile device 11, 12.

If at step S6 the beacon 30 determines that the request is not a request for missing calibration data, the operation proceeds to step S7, where the request is processed as appropriate.

If at step S6 the beacon 30 determines that the request is a request for missing calibration data, the operation proceeds to step S8. Here, the value in the Control Data field is read. The value in the Control Data field is provided by the mobile device 11, 12 such as to identify the missing portion of the calibration data by its counter value.

Next, at step S9, a response message is prepared by the beacon 30. In BLE, this may be a BCST_RSP PDU. The response message may take the form shown in FIG. 7. The response message is prepared with a payload that includes the portion of the calibration data that is identified by the value in the Control Data field in the request, and the counter value.

The inclusion of the counter value in the response message reduces the possibility that a mobile device 11, 12 will store a wrong portion of calibration data, which might otherwise occur if two mobile devices 11, 12 transmit request messages at about the same time, whether or not both are received by the beacon 30.

Advantageously, the response message is prepared with a payload that includes the portion of the calibration data that is identified by the value in the Control Data field in the request, and the counter, and also one or more immediately following portions of the calibration data. To advantage, the response message is prepared with a payload that includes the maximum number of immediately following portions of the calibration data that can fit within the response message, as dictated by the maximum size of the payload. In a BCST_RSP PDU, the usable payload is the BcstRspData field, which has a capacity such as to hold three portions each of nine bytes/octets of calibration data.

The response message includes an indication that it carries a portion of calibration data. In a BCST_RSP PDU, the indication may be a value in the Control field of the PDU. For instance, the mobile device 11, 12 may be configured to recognise the value in the Control field to indicate that the response carries a portion of calibration data. For instance, both the mobile device 11, 12 and the beacon 30 may be configured to know that a predetermined bit, for instance bit 8, of the Control field, indicates whether the response carries a portion of calibration data. Both the mobile device 11, 12 and the beacon 30 may be configured to know that a predetermined value, for instance 1, indicates that the response carries a portion of calibration data, and that the opposite value, for instance 0, indicates that the response does not carry a portion of calibration data.

Counter values may or may not be provided in the response message for the immediately following portions of the calibration data. Including the counter values has the effect of simplifying operation in the mobile device 11, 12. Not including the counter values has the effect of allowing more of the payload of the response message to be used for carrying calibration data.

Next, the prepared response message is broadcast at step S10. There is no switching between different antenna elements 126 during transmission of the response message; instead only one antenna element, for instance a central antenna element, is used during transmission of this message.

Following step S10, or following step S7, it is determined whether another request is received from a mobile device before the timer expires. A request takes the form in this embodiment of a BLE BCST_REQ PDU. If no request is received, the operation returns to step S2, where the counter is reset before another advertisement message is transmitted at step S3. This provides transmission of the advertisement messages at intervals set by the timer. If a request is received, the operation returns to step S5.

Step S11 may be performed in parallel with steps S5 to S10. In this way, the beacon 30 can monitor for further replies whilst dealing with an already received request.

The beacon 30 is configured also to provide the whole calibration data to a mobile device 11, 12 at the specific request of the mobile device 11, 12.

For instance, at step S6, the beacon determines whether the request is a request for a whole of the calibration data. This involves comparing the value in the Control field of the request with stored data that relates values to their meanings. The mobile device 11, 12 is configured to include a value in the Control field that indicates that the request is a request for a whole of the calibration data. The beacon 30 is configured to recognise the value in the Control field to indicate that the request is a request for the whole of the calibration data. For instance, both the mobile device 11, 12 and the beacon 30 may be configured to know that a predetermined bit, for instance bit 7, of the Control field, indicates whether the request is a request for a whole of the calibration data. Both the mobile device 11, 12 and the beacon 30 may be configured to know that a predetermined value, for instance 1, indicates that the request is a request for the whole of the calibration data, and that the opposite value, for instance 0, indicates that the request is not a request for the whole of the calibration data.

If at step S6 the beacon 30 determines that the request is a request for the whole of the calibration data, at step S7 the beacon 30 commences delivery of the whole of the calibration data to the mobile device 11, 12. Delivery is performed relatively quickly, and significantly more quickly than the calibration data can be delivered autonomously as described above with reference to FIG. 2, or as a combination of the operations of FIGS. 2 and 3. For instance, delivery may be performed using data packets that are able to be transmitted at a relatively high frequency on data channels. In BLE, a new PDU is defined for this purpose, named "Data_Channel_BCST_IND". By minimising signalling overhead in the PDU, the PDU can accommodate up to 31 bytes/octets of data. With this size of PDU, delivering 600 bytes of calibration data can be achieved in 20 PDUs. There is no switching between different antenna elements 126 during transmission of the Data_Channel_BCST_IND PDUs; instead only one antenna element, for instance a central antenna element, is used during transmission of these PDUs.

Figure 4:
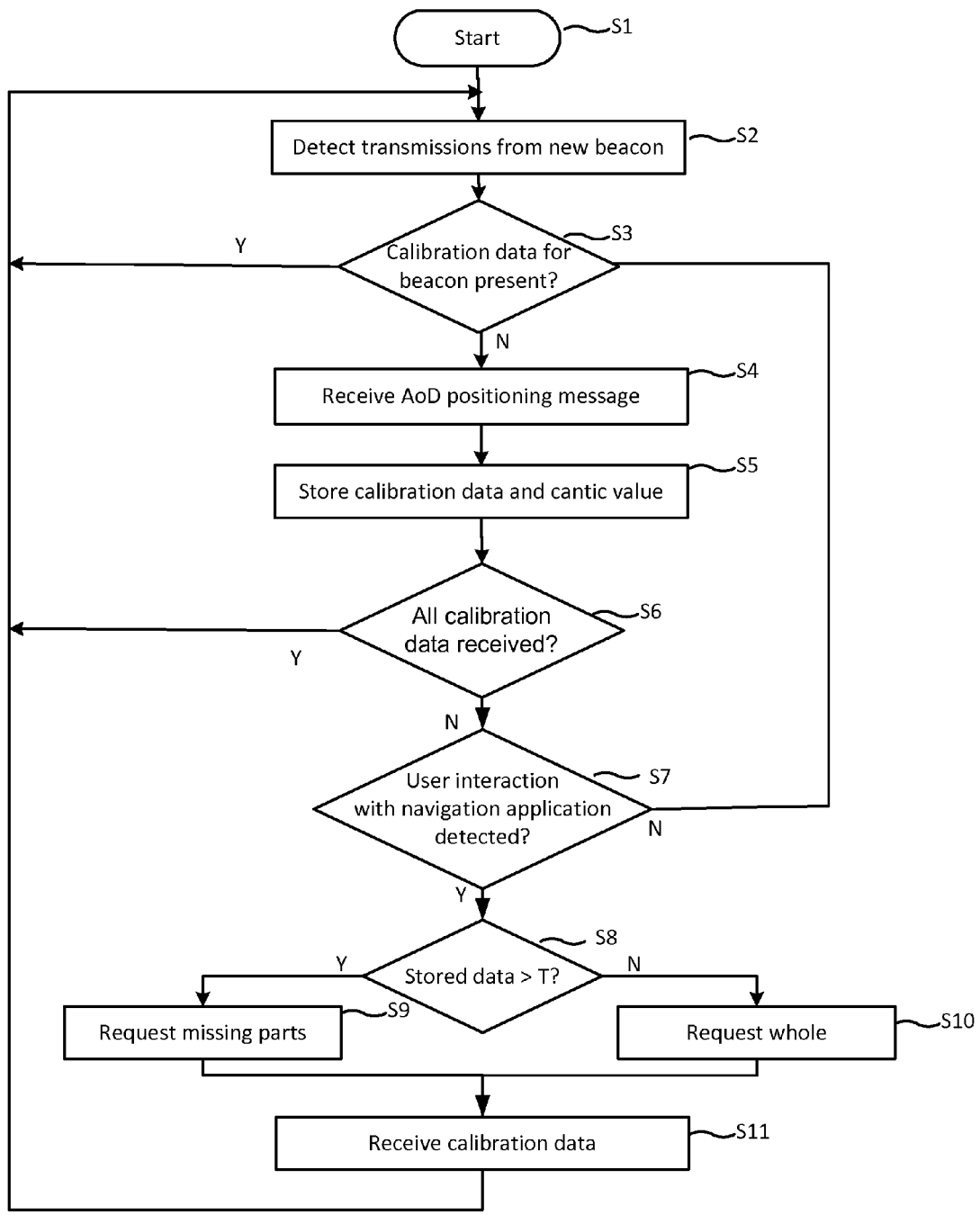
FIG. 4 is a flow chart illustrating operation of a mobile device included in the system of FIG. 1 according to embodiments of the invention.

Operation of a mobile device 11, 12 in procuring calibration data will now be described with reference to FIG. 4. This operation may be performed in parallel with other operations within the mobile device 11, 12.

Operation starts at step S1. At step S2, the mobile device 11, 12 detects transmissions from a new beacon 30. A new beacon 30 here is one which the mobile device 11, 12 has not detected recently, for instance since last powering up.

At step S3, the mobile device 11, 12 determines whether calibration data for the new beacon 30 is stored in the mobile device. Step S3 involves the mobile device 11, 12 reading an antenna type identifier from a message, for instance an advertising message, transmitted by the beacon 30 and comparing the received antenna type identifier to a list of identifiers stored within the mobile device 11. The list of antenna type identifiers in the mobile device 11, 12 is populated by the mobile device as it obtains calibration data for new antenna types. Calibration data for one or more antenna types may be permanently stored within the mobile device 11, 12, and others may be added as needed. The antenna type information is provided by the beacon 30. The antenna type information identifies the antenna design, for instance through a manufacturer identifier and a design identifier. The antenna type information may also include a calibration data version identifier. There may be different calibration versions for a given antenna design if for instance there are different firmware or software versions running on different beacons that have the same antenna hardware.

On a positive determination, the operation returns to step S2, where the mobile device 11, 12 waits for detection of another new beacon 30. On a negative determination, the operation proceeds to step S4, where it starts to obtain calibration data for the antenna type of the new beacon 30.

At step S4, the mobile device 11, 12 receives a first AoD positioning message. This includes a portion of calibration data and a counter value, as described above with respect to beacon operation in FIG. 2. At step S5, the portion of the calibration data and the counter value are stored in the mobile device 11, 12.

Then, at step S6, the mobile device 11, 12 determines whether all calibration data for the antenna type of the new beacon has been received. Step S6 yields a positive determination only when all of the portions of calibration data that form the whole of the calibration data have been received. This is determined by the mobile device 11, 12 by checking whether a portion of calibration data has been received for each of the counter values. The number of counter values may be determined by the mobile device 11, 12 in any suitable way, for instance by determining that the last message before the message with the lowest counter value has been received, as well as all of the messages in between. Alternatively, the number of counter values (equating to the number of portions of calibration data) may be signalled by the beacon 30, for instance in the AoD positioning messages or in an advertising message.

Unless the mobile device 11, 12 determines that all of the calibration data portions have been received, the operation proceeds to step S7. Here, the mobile device 11, 12 determines whether the user has interacted with the navigation application 117. Such interaction might be indicative of a desire by the user to know the location of the device 11, 12, which could require positioning using the beacon 30 from which calibration data is currently being received. Unless user interaction with the navigation application 117 is detected, the operation returns to step S4, to receive the next AoD positioning message. If user interaction with the navigation application 117 is detected, the operation proceeds to step S8. At this stage, procuring the calibration data moves from slow but bandwidth efficient autonomous procurement, which is passive as far as the beacon 30 is concerned, to faster but less bandwidth procurement, which actively involves the beacon 30.

At step S8, the mobile device 11, 12 determines whether the amount of calibration data that has been received is sufficient to allow the missing portions of the calibration data easily to be obtained from the beacon, or whether the whole of the calibration data should be obtained. For instance, the mobile device 11, 12 may compare the number of received portions of calibration data to a threshold T.

If the threshold is exceeded, the mobile device 11, 12 proceeds to request the missing parts of the calibration data from the beacon at step S9. Step S9 involves the mobile device 11, 12 requesting and obtaining missing portions of the calibration data as described above with reference to FIG. 3.

If the threshold is not exceeded, the mobile device 11, 12 requests the whole of the calibration data from the beacon 30 at step S10. This uses the Data_Channel_BCST_IND PDUs as described above.

Whichever way the calibration data is requested, it is received by the mobile device 11, 12 at step S11, and the operation then returns to wait for detection of a new beacon at step S2.

Instead of or as well as requesting missing portions of the calibration data at step S9, the mobile device 11, 12 may take other action to obtain the missing portions of the calibration data. For instance, the mobile device 11, 12 may change its receiver's scheduling in order to increase the probability that the missing portions of calibration data could be received from another beacon 30. In the event that other beacons 30 within the same premises have the same antenna configuration, and thus the same calibration data with the same divisions, it might be quite likely that the missing calibration data portions could be received from another beacon relatively quickly. This is especially true in systems in which the calibration data transmission cycles of different beacons 30 are not synchronised. The antenna configuration of other beacons 30 can be determined from antenna type information included in advertising messages transmitted by those beacons 30. Changing the scheduling may involve increasing the duration of listening (receiving) windows, or possibly even listening continuously, until the whole of the calibration data has been received. The mobile devices 11, 12 are configured to reconstruct calibration data where the portions are received out-of-sequence, either because a single beacon 30 transmits them out-of-sequence, because they are received in different cycles of transmission of the set of calibration data by a beacon, or because they are received from multiple beacons that are not synchronised, or any combination thereof.

In the above, calibration data for a new beacon 30 is begun to be procured by the mobile device 11, 12 after the beacon has been detected. Alternatively, procurement of calibration data may commence only if another condition is present. For instance, procurement of calibration data may be dependent also on the mobile device 11, 12 making a determination that it is relatively likely that the mobile device 11, 12 will move within positioning range of the beacon 30. This can be determined for instance by detecting that a signal quality measure, for instance received signal strength, exceeds a threshold, or by detecting that a signal quality measure exceeds a threshold and is increasing at more than a threshold rate. If the mobile device 11, 12 does not support compressed calibration data, it is configured to respond to determining that it is relatively likely that the mobile device 11, 12 will move within positioning range of the beacon 30 by requesting uncompressed calibration data from the beacon 30 or from the server 40, for instance over a cellular data or Wi-Fi connection.

After receiving all the portions of calibration data, the mobile device 11, 12 uses the counter values associated with the portions of calibration data to reconstruct the set of calibration data from the received portions. If the reconstructed set of calibration data is compressed, the mobile device 11, 12 decompresses it. The mobile device 11, 12 then stores, after decompression if performed, the set of calibration data in memory. The stored, non-compressed calibration data can then be used by the mobile device 11, 12 to calculate bearings to one or more beacons 30 having the corresponding antenna configuration, and thus to position itself.

It will be appreciated that the above-described embodiments are not limiting on the scope of the invention, which is defined by the appended claims and their alternatives. Various alternative implementations will be envisaged by the skilled person, and all such alternatives are intended to be within the scope of the claims. A number of alternatives will now be described.

Although in the above a beacon 30 broadcasts only one set of calibration data, a beacon may instead be configured to broadcast multiple sets of calibration data, each relating to calibration of its antenna 126.

For instance, a beacon 30 may be configured to transmit two sets of calibration data, a first set having a relatively high compression and a second set having a relatively low compression. The set of calibration data with relatively high compression includes less data, so is broadcast over a relatively shorter period of time. However, it allows relatively low accuracy positioning by a mobile device 11, 12. The set of calibration data with relatively low compression includes more data, so is broadcast over a relatively longer period of time. However, it allows relatively high accuracy positioning by a mobile device 11, 12.

Different sets of calibration data may be identified by a version number. The version number may be part of the antenna type identifier, which is transmitted in advertising packets in parallel with the positioning packets. In this way, the positioning packets may not need to be provided with a version number or other data identifying the calibration data set.

Alternatively a superset of data may comprise two subsets. Each subset can be considered to be a set of data, and the sets may be combined to form a larger set. For instance, with frequency-domain compression methods, the data is compressed into low- and high-frequency components which can be used together. By defining the low-frequency components as a first subset and the high-frequency components (which is the majority of the compressed data) as a second subset, improved mobile performance can be obtained. In particular, a mobile device receiving the low-frequency components (which can be received relatively quickly) can obtain a relatively course location fix, and then obtain a more accurate fix after the high-frequency components have been received. Thus, as an alternative to broadcasting all the portions of the calibration data subsequently, the low-frequency components (which are also low-bandwidth) could be broadcasted by the beacon 30 more frequently than the high-frequency components. Put another way, the first subset is broadcast more frequently that the second subset. Each portion within the superset may have a unique counter value, although only a part of the range of counter values relates to the first subset. A mobile device 11, 12 can use the first subset to position itself even when the whole superset has not been received.

Although in the above 1 byte of the AoD positioning message is reserved for the counter, this is merely an example. Using fewer bits for the counter may allow more bits of the AoD positioning messages to be used for the compressed calibration data.

Figure 2:
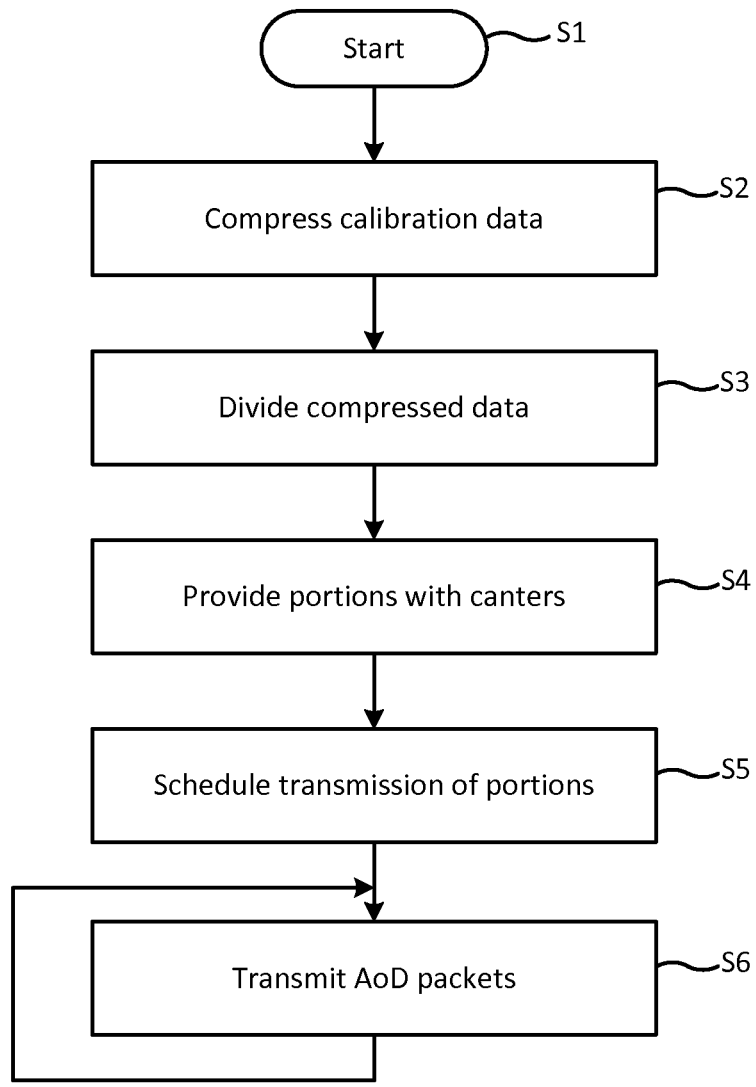
FIG. 2 is a flow chart illustrating operation of a beacon included in FIG. 1 according to embodiments of the invention.

Although steps S3 and S4 of FIG. 2 are said to be performed by the beacon 30, they may instead be performed remotely, for instance at the server 40, and then provided to the beacon. Alternatively, steps S3 and S4 may be divided between the beacon and a remote device such as the server 40.

Although each AoD positioning message is said to include a counter value, from which the mobile device 11, 12 can identify which position of the calibration data is contained therein, this may be omitted in some embodiments. Instead, a counter value may be included in only some AoD positioning messages and the beacon 30 ensures that the messages are transmitted in the correct order. In such embodiments, the mobile device 11, 12 may determine which portion of the calibration data is contained in a received AoD positioning message by inference using knowledge of the location of the AoD positioning message in the sequence as received and the counter values for the calibration data portions where these are included in the AoD positioning messages. In the event that one or more AoD positioning messages are not received because of interference or scheduling issues in the mobile device 11, 12, the mobile device may use knowledge of the times at which the AoD positioning message in the sequence were received, knowledge of the periodicity at which AoD messages are transmitted, and the counter values for the calibration data portions where these are included in the received AoD positioning messages both to identify missing portions so that they can be obtained in some other way and to reconstruct the calibration data from the portions once they have all been received.

Although in the above the positioning advertisement messages are transmitted on BLE advertising channels, it will be appreciated that the information communicated to the mobile devices 11, 12 in the positioning advertisement messages need not be communicated in this way. For instance, the positioning advertisement messages may be broadcast on one or more BLE data channels, for instance in SCAN_RSP containers.

Indeed, the invention is not limited to BLE. It will be appreciated that the concept underlying the above-described embodiments, as defined in the claims, is applicable to other systems in which the same considerations (e.g. limited bandwidth, positioning resolution etc.) are applicable. Other systems to which the invention may be applied and which are intended to be covered by the claims include unidirectional and bidirectional systems both present and future. Systems to which the invention may be applied include WiFi systems, pseudolite-based systems and such like.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

A computer-readable medium may comprise a computer-readable storage medium that may be any tangible media or means that can contain or store the instructions for use by or in connection with an instruction execution system, apparatus, or device, such as a computer as defined previously.

According to various embodiments of the previous aspect of the present invention, the computer program according to any of the above aspects, may be implemented in a computer program product comprising a tangible computer-readable medium bearing computer program code embodied therein which can be used with the processor for the implementation of the functions described above.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

The invention claimed is:

1. Apparatus, comprising:
a transmitter;
a multi-element antenna;
at least one processor; and
at least one memory having computer-readable code stored thereon,
wherein the computer-readable code when executed controls the at least one processor to perform a method comprising:
broadcasting multiple packets from the multi-element antenna, each packet comprising:
a positioning part; and
a calibration data part, wherein the calibration data part of a packet comprises:
a portion of calibration data; and
data indicating a location of the portion of calibration data in a set of calibration data, wherein broadcasting a packet comprises:
switching between different elements of the multi-element antenna in a sequence when broadcasting the positioning part of the packet; and
transmitting all of the calibration data part of the packet without switching between different elements of the multi-element antenna.

2. Apparatus as claimed in claim 1, wherein the data indicating a location of the portion of calibration data in the set of calibration data comprises a counter value that is unique to the corresponding portion of calibration data.

3. Apparatus as claimed in claim 2, wherein the set of calibration data is compressed calibration data.

4. Apparatus as claimed in claim 3, wherein the set of calibration data is image compressed calibration data.

5. Apparatus as claimed in claim 4, wherein the computer-readable code when executed causes the computing apparatus to perform:
compressing a set of uncompressed calibration data to provide the set of compressed calibration data;
dividing the set of compressed calibration data into multiple portions of partial calibration data; and
scheduling broadcasting of the multiple portions of partial calibration data in the positioning packets.

6. Apparatus as claimed in claim 1, wherein the computer-readable code when executed causes the computing apparatus to perform:
receiving a request message;
identifying from the request message that the message is a request for a portion of calibration data; and
transmitting a response message including the requested portion of calibration data.

7. Apparatus as claimed in claim 6, wherein the response message includes at least one of the following:
- a) data indicating a location of the portion of calibration data in the set of calibration data, or
- b) a portion of calibration data than is larger than the portions of calibration data included in the positioning packets.

8. Apparatus, comprising:
- a receiver;
- at least one processor; and
- at least one memory having computer-readable code stored thereon, wherein the computer-readable code when executed controls the at least one processor to perform a method comprising:
- receiving multiple positioning packets from a multi-element antenna, each positioning packet comprising:
  - a positioning part; and
  - a calibration data part, wherein the calibration data part of a packet comprises:
    - a portion of calibration data; and
    - data indicating a location of the portion of calibration data in a set of calibration data;
- using the data indicating the locations of the portions of calibration data in the set of calibration data from the multiple packets to reconstruct the set of calibration data; and
- storing the reconstructed set of calibration data in memory.

9. Apparatus as claimed in claim 8, wherein the data indicating a location of the portion of calibration data in the set of calibration data comprises a counter value that is unique to the corresponding portion of calibration data.

10. Apparatus as claimed in claim 9, wherein the set of calibration data is compressed calibration data, the method comprising decompressing the received set of compressed calibration data and storing the resulting decompressed calibration data.

11. Apparatus as claimed in claim 10, wherein the computer-readable code when executed causes the computing apparatus to perform receiving at least one of the following:
- a) the multiple positioning packets from a multi-element antenna of a first beacon, or
- b) the multiple positioning packets from multi-element antennas of plural beacons.

12. Apparatus as claimed in claim 11, wherein the computer-readable code when executed causes the computing apparatus to perform:
- transmitting a request message, the request message including an indication that the message is a request for a portion of calibration data; and
- receiving a response message including the requested portion of calibration data.

13. Apparatus as claimed in claim 12, wherein the computer-readable code when executed causes the computing apparatus to perform transmitting the request message including data indicating a location of a missing portion of calibration data in the set of calibration data.

14. Apparatus as claimed in claim 13, wherein the response message includes data indicating a location of the portion of calibration data in the set of calibration data.

15. Apparatus as claimed in claim 8, wherein the computer-readable code when executed causes the computing apparatus to perform:
- transmitting a request message, the request message indicating that the message is a request for the whole set of calibration data; and
- receiving multiple response messages each including a portion of the calibration data, wherein the multiple response messages together include the whole set of calibration data.

* * * * *